United States Patent
Gokhale

(10) Patent No.: US 7,890,718 B2
(45) Date of Patent: *Feb. 15, 2011

(54) SYSTEM AND METHOD FOR PERFORMING TIME-FLEXIBLE CALENDRIC STORAGE OPERATIONS

(75) Inventor: Parag Gokhale, Ocean, NJ (US)

(73) Assignee: Comm Vault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/467,863

(22) Filed: May 18, 2009

(65) Prior Publication Data

US 2009/0228894 A1   Sep. 10, 2009

Related U.S. Application Data

(63) Continuation of application No. 11/313,225, filed on Dec. 19, 2005, now Pat. No. 7,543,125.

(51) Int. Cl.
*G06F 13/00* (2006.01)
*G06F 13/28* (2006.01)

(52) U.S. Cl. .................. 711/162; 711/161; 711/154

(58) Field of Classification Search .......... None
See application file for complete search history.

(56) References Cited

U.S. PATENT DOCUMENTS

| | | |
|---|---|---|
| 4,296,465 A | 10/1981 | Lemak |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |

(Continued)

FOREIGN PATENT DOCUMENTS

EP   0259912   3/1988

(Continued)

OTHER PUBLICATIONS

Armstead et al., "Implementation of a Campus-wide Distributed Mass Storage Service: *The Dream* vs.*Reality*," *IEEE*, 1995, pp. 190-199.

(Continued)

*Primary Examiner*—Reginald G Bragdon
*Assistant Examiner*—Eric S Cardwell
(74) *Attorney, Agent, or Firm*—Knobbe, Martens, Olson & Bear, LLP

(57) ABSTRACT

A system and method are provided for creating a non-standard calendar that may have customized attributes, such as number of days in a month, first day of a month, number of months in a year, first month of a year, number of years, or other customized attributes. Such non-standard calendars may be similar to non-standard calendars used by companies, enterprises or other organizations, such as a fiscal calendar, academic calendar, or other calendar. A storage management system manager may have a database of storage policies that include preferences and frequencies for performing storage operations, and associations with a non-standard calendar. The storage manager can initiate storage operations based on the storage policy using data that may be identified according to selection criteria, and determine a time to perform the storage operation according to a non-standard calendar.

17 Claims, 14 Drawing Sheets

U.S. PATENT DOCUMENTS

| | | |
|---|---|---|
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,426,284 A | 6/1995 | Doyle |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,598,546 A | 1/1997 | Blomgren |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,649,185 A | 7/1997 | Antognini et al. |
| 5,673,381 A | 9/1997 | Huai et al. |
| 5,675,511 A | 10/1997 | Prasad et al. |
| 5,682,513 A | 10/1997 | Candelaria et al. |
| 5,687,343 A | 11/1997 | Fecteau et al. |
| 5,699,361 A | 12/1997 | Ding et al. |
| 5,719,786 A | 2/1998 | Nelson et al. |
| 5,729,743 A | 3/1998 | Squibb |
| 5,734,817 A | 3/1998 | Roffe et al. |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,790,828 A | 8/1998 | Jost |
| 5,805,920 A | 9/1998 | Sprenkle et al. |
| 5,812,398 A | 9/1998 | Nielsen |
| 5,812,748 A | 9/1998 | Ohran et al. |
| 5,813,009 A | 9/1998 | Johnson et al. |
| 5,813,013 A | 9/1998 | Shakib et al. |
| 5,813,017 A | 9/1998 | Morris |
| 5,829,046 A | 10/1998 | Tzelnic et al. |
| 5,845,257 A | 12/1998 | Fu et al. |
| 5,860,104 A | 1/1999 | Witt et al. |
| 5,864,871 A | 1/1999 | Kitain et al. |
| 5,875,478 A | 2/1999 | Blumenau |
| 5,884,067 A | 3/1999 | Storm et al. |
| 5,887,134 A | 3/1999 | Ebrahim |
| 5,901,327 A | 5/1999 | Ofek |
| 5,924,102 A | 7/1999 | Perks |
| 5,933,104 A | 8/1999 | Kimura |
| 5,950,205 A | 9/1999 | Aviani, Jr. |
| 5,956,519 A | 9/1999 | Wise et al. |
| 5,956,733 A | 9/1999 | Nakano et al. |
| 5,970,233 A | 10/1999 | Lie et al. |
| 5,970,255 A | 10/1999 | Tran et al. |
| 5,974,563 A | 10/1999 | Beeler, Jr. |
| 5,987,478 A | 11/1999 | See et al. |
| 5,991,753 A | 11/1999 | Wilde |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,026,437 A | 2/2000 | Muschett et al. |
| 6,052,735 A | 4/2000 | Ulrich et al. |
| 6,076,148 A | 6/2000 | Kedem et al. |
| 6,078,934 A | 6/2000 | Lahey et al. |
| 6,094,416 A | 7/2000 | Ying |
| 6,105,037 A | 8/2000 | Kishi |
| 6,105,129 A | 8/2000 | Meier et al. |
| 6,108,640 A * | 8/2000 | Slotznick ..................... 705/26 |
| 6,122,668 A | 9/2000 | Teng et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,382 B1 | 7/2001 | Cabrera et al. |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar et al. |
| 6,301,592 B1 | 10/2001 | Aoyama et al. |
| 6,314,439 B1 | 11/2001 | Bates et al. |
| 6,314,460 B1 | 11/2001 | Knight et al. |
| 6,324,581 B1 | 11/2001 | Xu et al. |
| 6,328,766 B1 | 12/2001 | Long |
| 6,330,570 B1 * | 12/2001 | Crighton ............................ 1/1 |
| 6,330,572 B1 | 12/2001 | Sitka |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,356,801 B1 | 3/2002 | Goodman et al. |
| 6,367,029 B1 | 4/2002 | Mayhead et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,453,325 B1 | 9/2002 | Cabrera et al. |
| 6,473,794 B1 | 10/2002 | Guheen et al. |
| 6,487,561 B1 | 11/2002 | Ofek et al. |
| 6,487,644 B1 | 11/2002 | Huebsch et al. |
| 6,493,811 B1 | 12/2002 | Blades et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,219 B1 | 5/2003 | Lee et al. |
| 6,564,228 B1 | 5/2003 | O'Connor |
| 6,581,143 B2 | 6/2003 | Gagne et al. |
| 6,604,149 B1 | 8/2003 | Deo et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,760,723 B2 | 7/2004 | Oshinsky et al. |
| 6,886,020 B1 | 4/2005 | Zahavi et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,174,312 B2 | 2/2007 | Harper et al. |
| 7,246,207 B2 | 7/2007 | Kottomtharayil et al. |
| 7,543,125 B2 | 6/2009 | Gokhale |
| 2002/0004883 A1 | 1/2002 | Nguyen et al. |

| | | | |
|---|---|---|---|
| 2002/0042869 | A1 | 4/2002 | Tate et al. |
| 2003/0163399 | A1 | 8/2003 | Harper et al. |
| 2003/0172158 | A1 | 9/2003 | Pillai et al. |
| 2004/0010487 | A1 | 1/2004 | Prahlad et al. |
| 2005/0033800 | A1 | 2/2005 | Kavuri et al. |
| 2005/0044114 | A1 | 2/2005 | Kottomtharayil et al. |
| 2005/0114406 | A1 | 5/2005 | Borthakur et al. |
| 2005/0246510 | A1 | 11/2005 | Retnamma et al. |
| 2006/0010154 | A1 | 1/2006 | Prahlad et al. |
| 2007/0143756 | A1 | 6/2007 | Gokhale |
| 2009/0248762 | A1 | 10/2009 | Prahlad et al. |
| 2009/0271791 | A1 | 10/2009 | Gokhale |

FOREIGN PATENT DOCUMENTS

| | | |
|---|---|---|
| EP | 0405926 | 1/1991 |
| EP | 0 467 546 | 1/1992 |
| EP | 0467546 | 1/1992 |
| EP | 0774715 | 5/1997 |
| EP | 0809184 | 11/1997 |
| EP | 0862304 | 9/1998 |
| EP | 0 899 662 | 3/1999 |
| EP | 0899662 | 3/1999 |
| EP | 0981090 | 2/2000 |
| EP | 1174795 | 1/2002 |
| JP | H11-102314 | 4/1999 |
| JP | H11-259459 | 9/1999 |
| JP | 2001-60175 | 3/2001 |
| WO | WO 94/17474 | 8/1994 |
| WO | WO-95/13580 | 5/1995 |
| WO | WO-98/39707 | 9/1998 |
| WO | WO-99/12098 | 3/1999 |
| WO | WO 99/14692 | 3/1999 |
| WO | WO 01/04756 | 1/2001 |
| WO | WO 2005/050381 | 6/2005 |

OTHER PUBLICATIONS

Arneson, David A., Control Data Corporation,*Development of Omniserver*, Mass Storage Systems, 1990, pp. 88-93.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

International Preliminary Report on Patentability in PCT/US2004/038278 filed Nov. 15, 2004, (Publication No. WO2005/050381) dated May 15, 2006.

International Search Report in PCT/US2004/038278 filed Nov. 15, 2004, (Publication No. WO2005/050381) dated Feb. 1, 2006.

International Search Report on Patentability in PCT/US00/19364 filed Jul. 14, 2000 (Publication No. WO01/04756) dated Dec. 21, 2000.

Weatherspoon H. et al., "Silverback: A Global-Scale Archival System," Mar. 2001, pp. 1-15.

* cited by examiner

| ID | 1st Year | No of Yrs. | 1st Month | 1st Date | Mths/Yr | D/Mth | Default | Operations | Storage Policy |
|---|---|---|---|---|---|---|---|---|---|
| Email | 2000 | 10 | January | 2 | 12 | 28 | Yes | Copy | ABCSP |
| NY Group | 2000 | 5 | April | 1 | 12 | 30 | Yes | Sel Deletion | NYGroupSP |
| CAL | 2003 | 20 | September | Day after Labor Day | 4 | 90 | No | Sel Copy | CALSCSP |
| ABC | 2006 | 2 | April | 16 | 12 | 30 | No | Retention | ERetSP |
| Sales | 2005 | 3 | November | Day after Thanksgiving | 6 | 31 | Yes | Migration | SMigSP |
| Inventory | 2006 | 10 | April | 15 | 12 | 28 | Yes | Restore | InvRestSP |

FIG. 5

Define Months for: ABC

Customize the months definition by editing the Days column. Then click Apply to view the updated Start dates.

[Previous] 2006 [Next]

| Month | Days | Start Date |
|---|---|---|
| April 2006 | 30 | April 16, 2006 |
| May 2006 | 28 | May 16, 2006 |
| June 2006 | 28 | June 13, 2006 |
| July 2006 | 35 | July 11, 2006 |
| August 2006 | 28 | August 15, 2006 |
| September 2006 | 35 | September 12, 2006 |
| October 2006 | 28 | October 17, 2006 |
| November 2006 | 42 | November 14, 2006 |
| December 2006 | 20 | December 26, 2006 |
| January 2007 | 28 | January 15, 2007 |
| February 2007 | 35 | February 12, 2007 |
| March 2007 | 28 | March 19, 2007 |

[Copy To] [Apply]

[OK] [Cancel] [Help]

FIG. 9

SYSTEM AND METHOD FOR PERFORMING TIME-FLEXIBLE CALENDRIC STORAGE OPERATIONS

CROSS-REFERENCE TO RELATED APPLICATIONS

This application claims priority to U.S. application Ser. No. 11/313,225, filed Dec. 19, 2005, entitled SYSTEM AND METHOD FOR PERFORMING TIME-FLEXIBLE CALENDRIC STORAGE OPERATIONS, the entirety of which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

Field of the Invention

The invention disclosed herein relates generally to performing time flexible storage operations.

Current storage management systems employ a number of different methods to perform storage operations on electronic data. Such storage operations may be scheduled in a job queue, which may be scheduled based on a calendar. In conventional storage systems, the calendar used to schedule storage operations is a standard Gregorian calendar which, in one calendar year beginning January and ending in December, has twelve months, each having a predefined number of days in each month totaling 365 days per year, and 366 days in a leap year. Some enterprises, companies, users or other entities have specialized non-standard calendars for enterprise operations. Such calendars may be different than the standard Gregorian calendar. For example, a company may choose to follow a fiscal calendar and begin its calendar in April, an academic institution may choose to begin its year after Labor Day, a toy company may choose to begin its year on the first Friday after Thanksgiving, another company may wish to begin its week on a Wednesday, and other entities may have other such calendars. When a company has a specialized calendar, it is convenient to schedule all aspects of the company or entity according to the calendar.

SUMMARY OF THE INVENTION

Systems and methods are described herein for performing time flexible storage operations. In one embodiment, a method for performing a storage operation is provided including: receiving a non-standard calendar and a storage policy, the storage policy including data indicating a frequency for performing a storage operation; determining, based on the frequency, a time corresponding to frequency according to the non-standard calendar; and at the time, initiating the storage operation. Data for performing the storage operation may be identified according to a selection criterion. If it is determined that the time occurs after a first term of the non-standard calendar expired; a second term of the non-standard calendar may be predicted, wherein the time occurs during the second term; and wherein the first term and the second term of the non-standard calendar include at least one common time flexible preference.

In another embodiment, a method for scheduling a storage operation, is provided including receiving data indicating a non-standard calendar; associating the non-standard calendar with a storage policy; based on the storage policy, determining a frequency for performing a storage operation; determining a storage operation time, the storage operation time corresponding to the frequency for performing the storage operation using the non-standard calendar; and scheduling the storage operation to be performed in a Gregorian calendar based storage management system at the storage operation time. An indication of an association of the non-standard calendar and the storage policy may be stored in an index. If the storage operation time comprises a time before or after a first term of the non-standard calendar, an alert may be transmitted, and/or a second term of the non-standard calendar may be predicted, wherein the storage operation time occurs during the second term; and wherein the first term and the second term of the non-standard calendar include at least one common time flexible preference. Data for performing the storage operation may be identified according to a selection criterion.

In another embodiment, a method for scheduling a storage operation is provided including receiving a storage policy, the storage policy including a frequency for performing a storage operation; based on a selection criteria, identifying a data item for performing the storage operation, identifying a non-standard calendar associated with the storage policy; determining a time to perform the storage operation, the time corresponding to the frequency for performing the storage operation based on the non-standard calendar; and at the determined time, performing the storage operation. The selection criteria may be a time criterion to which a corresponding time may be determined based on the non-standard calendar. The non-standard calendar may be identified for the storage operation as the non-standard calendar associated with the storage policy in an index. Examples of storage operations may be a selective deletion operation, a selective copy operation, or a retention operation. If the determined time for performing the storage operation occurs after a first term of the non-standard calendar expired; a second term of the non-standard calendar may be predicted, wherein the determined time occurs during the second term; and wherein the first term and the second term of the non-standard calendar include at least one common time flexible preference.

In another embodiment, a storage management system for scheduling a storage operation, is provided including a calendar module communicatively coupled to a year module, a month module, a day module, and a offset module; the calendar module communicatively coupled to a storage manager and an index; wherein the year module, month module, day module and offset module are programmed to provide a non-standard calendar; wherein the index is capable of storing data indicating an association of the non-standard calendar and a storage policy; and wherein the storage manager is programmed to consult the storage policy in the index, determine a time to perform a storage operation according to the storage policy and non-standard calendar, and direct the storage operation at the determined time.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5 is a graphical user interface for defining months in a calendar according to an embodiment of the invention;

FIGS. 9 and 10 are graphical user interfaces for scheduling a storage operation according to embodiments of the invention;

DETAILED DESCRIPTION OF THE PREFERRED EMBODIMENT

Figure 1:
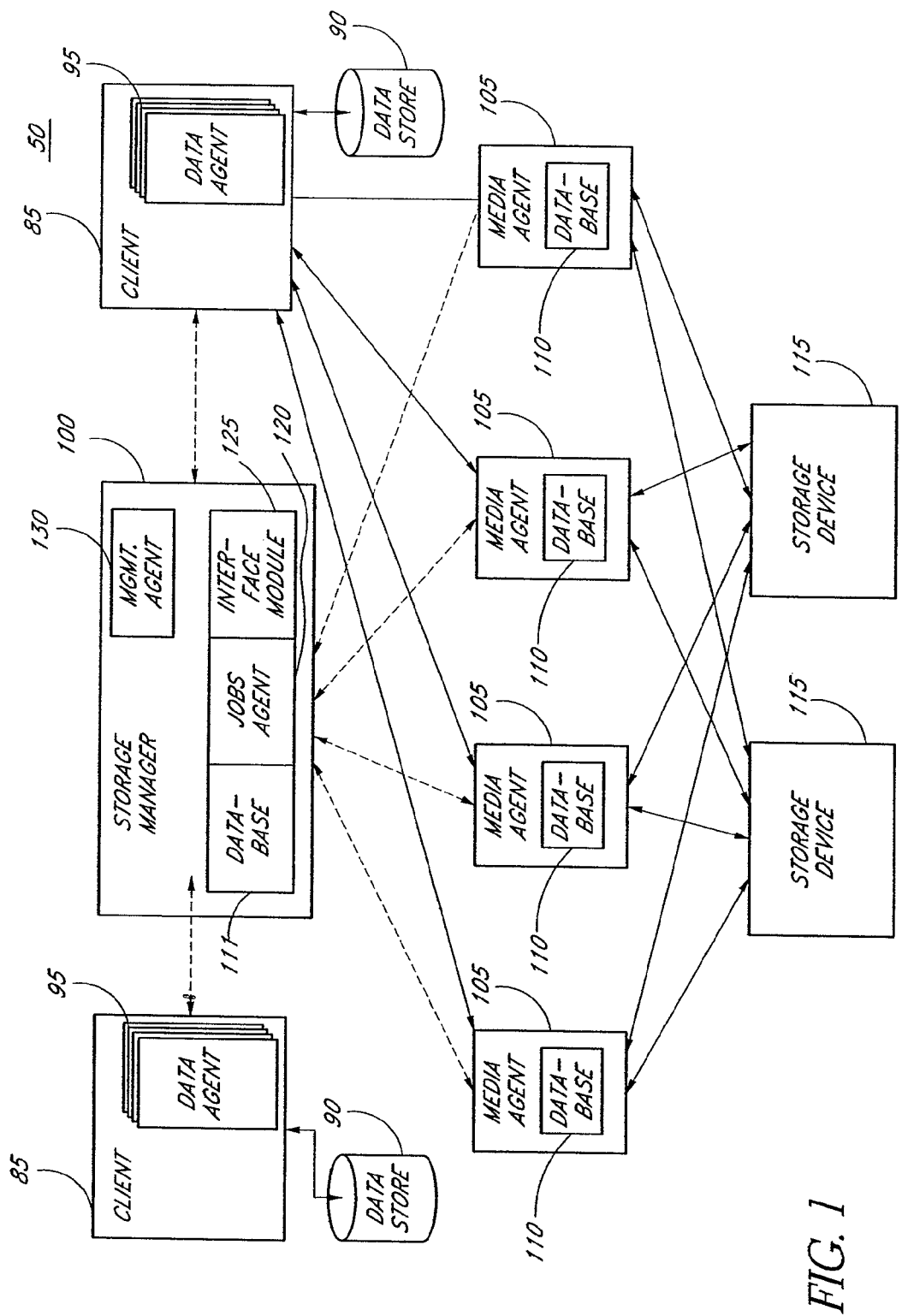
FIG. 1 is a block diagram of a storage system according to an embodiment of the invention.

With reference to FIGS. 1 through 14, embodiments and features of the invention are presented. FIG. 1 illustrates a block diagram of a storage operation cell 50 that may perform storage operations on electronic data in a computer network in accordance with an embodiment of the present invention. As shown, storage operation cell 50 may generally include a storage manager 100, a data agent 95, a media agent 105, a storage device 115, and, in some embodiments, may include certain other components such as a client 85, a data or information store 90, databases or indexes 110 and 111, jobs agent 120, an interface module 125, and a management agent 130. Such system and elements thereof are exemplary of a modular storage management system such as the CommVault QiNetix system, and the CommVault GALAXY backup system, available from CommVault Systems, Inc. of Oceanport, N.J.

A storage operation cell, such as cell 50, may generally include combinations of hardware and software components associated with performing storage operations on electronic data. Storage operation cells generally are capable of performing storage operations and other types of storage management functions. In accordance with the invention, additional storage operations performed by storage operation cells may include creating, storing, retrieving, and migrating primary data copies and secondary data copies (which may include, for example, snapshot copies, backup copies, HSM copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, relationships between system components and use of a third party application, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time, which may be based on a flexible non-standard calendar, before being aged to another tier of secondary storage, retained, copied, or deleted according to specific criteria, copied to secondary storage using a replication copy or a specified number of streams, a frequency for performing storage operations, etc. A storage policy may be stored to a storage manager database or index 111, to archive media as metadata for use in restore operations or other storage operations, or to other locations or components of the system. The storage policy may be associated with a standard calendar or a non-standard calendar, for example, by storing an indication or pointer in the index 111 of the relationship between the storage policy and the calendar.

As described herein, a non-standard calendar may be useful in storage management applications because the calendar used by the storage management system can conform to a particular calendar in use in an enterprise, company or other entity. A storage management system non-standard calendar facilitates and enables scheduling storage operations following a non-standard or other existing calendar in use for other enterprise operations, such as inventory management, sales performance tracking, revenue reporting, financial modeling, or other aspect of an enterprise. Alternatively, a non-standard calendar can be used to define a storage operation schedule according to an enterprise's requirements, which may not necessarily follow a particular or standard/Gregorian calendar.

A schedule policy may specify a frequency, or when and how often to perform a storage operation, the calendar on which to base a storage operation schedule, and may also specify performing certain storage operations on sub-clients of data and how to treat those sub-clients. Schedule policy information may be included in a storage policy, or associated with a storage policy.

A sub-client may represent static or dynamic associations of portions of data of a volume and are mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, a sub-client may be all media in an associated storage device and the sub-client is associated with a non-standard calendar and storage policy which requires that certain storage operations be performed on a schedule or at a particular frequency that is based on the non-standard calendar.

A storage preference may be a storage policy, user preference or other storage preference associated with performance of storage operations. In some embodiments the storage preference is defined by a system user or system administrator. In other embodiments, the storage preference is a default preference. Examples of storage preferences can include: a non-standard calendar to use for storage operations, data security settings, encryption settings, data retention requirements, frequency of storage operations, such as frequency of backups, types of data for storage operations, such as data types for backups, types of storage operations to perform in the component group, network pathways, such as preferred network pathways to perform a storage operation, scheduling, such as a schedule of storage operations, reports, such as automatic generation of system reports regarding the group, which can include, for example, the storage operations performed by the group, or other storage preference.

A storage operation cell may be associated with a storage policy, schedule policy, storage preferences, user preferences, non-standard calendar or other storage rules or preferences. The storage operation cell may be automatically configured for storage needs and associated with a particular user, application, data type, organization, department or other group. For example, in a financial company, one or more storage operation cells may be configured to handle data generated by a New York office, a particular application, one or more clients, one or more trader's data, financial data, financial trades data, email, documents, or other class of data. Each storage operation cell may be associated with a storage policy which sets forth the storage requirements for the cell. In addition, a non-standard calendar may be associated with the cell or storage policy which may dictate a special or customized calendar for performing storage operations.

Storage operation cells may contain not only physical devices, but also may represent logical concepts, organizations, and hierarchies. For example, a first storage operation cell 50 may be configured to perform a storage operation, such as data backup or other types of data migration, and may include a variety of physical components including a storage manager 100 (or management agent 130), a media agent 105, a client component 85, and other components as described herein. A second storage operation cell may contain the same or similar physical components, however, it may be configured to perform other storage operations, such as monitoring a primary data copy or replication copy volume or performing other known storage operations.

Data agent 95 may be a software module or part of a software module that is generally responsible for archiving, migrating, and recovering data from client computer 85 stored in an information store 90, or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Embodiments of the present invention may employ multiple data agents 95 each of which may backup, migrate, and recover data associated with a different application. For example, different individual data agents 95 may be designed to handle MICROSOFT EXCHANGE data, LOTUS NOTES data, MICROSOFT WINDOWS 2000 file system data, MICROSOFT ACTIVE DIRECTORY OBJECTS data, and other types of data known in the art. Other embodiments may employ one or more generic data agents 95 that can handle and process multiple data types rather than using the specialized data agents described above.

Generally speaking, storage manager 100 may be a software module or other application that coordinates and controls storage operations performed by storage operation cell 50. Storage manager 100 may communicate with some or all elements of storage operation cell 50 including client computers 85, data agents 95, media agents 105, and storage devices 115, to initiate and manage system backups, migrations, and data recovery.

Figure 2:
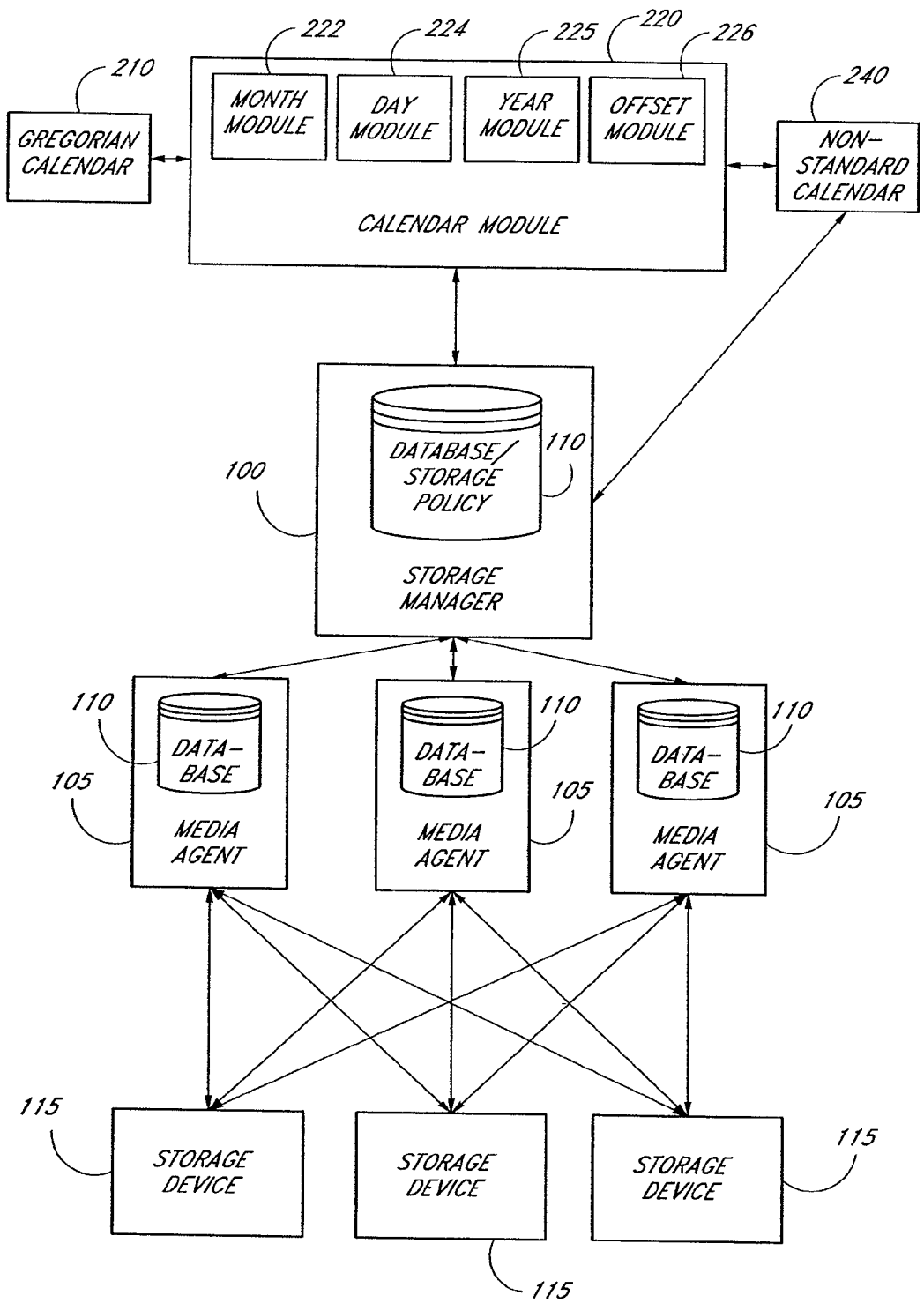
FIG. 2 is a block diagram of an aspect of the storage system of FIG. 1 according to an embodiment of the invention.

Referring to FIG. 2, the storage manager 100 may have access to a non-standard calendar 240, which may be created and customized using a calendar module 220. The calendar module 220 may be a separate module, or its functionality may be provided by the storage manager 100 or other cell component. The calendar module 220 may customize a calendar according to preferences, which may be time-related, time-flexible, and which may be provided via a user input or a user preference, or via storage policy, storage template, or other input. For example, information or a data file relating to a standard or Gregorian calendar 210 may be input into the calendar customization module and calendar preferences entered via one or more of the month module 222, day module 224, year module 225, and offset module 226. The functionality of each of the calendar module 200, month module 222, day module 224, year module 225, and offset module 226 is further described herein. A resulting non-standard calendar 240 may be stored in a database, data table or index.

Referring again to FIG. 1, storage manager 100 may also include a jobs agent 120 that monitors the status of some or all storage operations previously performed, currently being performed, or scheduled to be performed by storage operation cell 50. For example, the jobs agent 120 may consult a storage policy and a non-standard calendar to monitor and schedule storage operations. Jobs agent 120 may be communicatively coupled with an interface agent 125 (typically a software module or application). Interface agent 125 may include information processing and display software, such as a graphical user interface ("GUI"), an application program interface ("API"), or other interactive interface through which users and system processes can retrieve information about the status of storage operations.

Through interface 125, users may optionally issue instructions to various storage operation cells 50 regarding performance of the storage operations as described and contemplated herein. For example, a user may modify a schedule concerning a calendar or other schedule for pending copies or other types of copies as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device). As a further example, interface 125 may display the calendar associated with a particular cell or type of data storage and may allow a user to determine overall scheduling associated with a particular data type, or certain storage operation cell 50 or other storage operation as predefined or user-defined.

Storage manager 100 may also include a management agent 130 that is typically implemented as a software module or application program. In general, management agent 130 provides an interface that allows various management components 100 in other storage operation cells 50 to communicate with one another. For example, assume a certain network configuration includes multiple cells 50 adjacent to one another or otherwise logically related in a WAN or LAN configuration (not shown). With this arrangement, each cell 50 may be connected to another cell through each respective interface module 125. This allows each cell 50 to send and receive certain pertinent information from other cells 50 including status information, routing information, information regarding capacity and utilization, etc. These communication paths may also be used to convey information and instructions regarding storage operations.

Storage manager 100 may also maintain an index cache, a database, or other data structure 111. The data stored in database 111 may be used to indicate logical associations between components of the system, user preferences, management tasks, storage policies, associations of non-standard calendars, some SRM or HSM data or other useful data. As further described herein, some of this information may be stored in a media agent database 110 or other local data store according to some embodiments. For example, the storage manager 100 may use data from database 111 to track logical associations of primary copies of data, storage policies, non-standard calendars, media agents 105 and storage devices 115 or between other components of the system.

Generally speaking, a media agent 105 may be implemented as a software module that conveys data, as directed by a storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to a particular storage device 115.

In operation, a media agent 105 associated with a particular storage device 115 may instruct the storage device to use a robotic arm or other retrieval means to load or eject a certain storage media, and to subsequently archive, migrate, or restore data to or from that media. Media agents 105 may communicate with a storage device 115 via a suitable communications path such as a SCSI or fiber channel communications link. In some embodiments, the storage device 115 may be communicatively coupled to a data agent 105 via a Storage Area Network ("SAN").

Each media agent 105 may maintain an index cache, a database, or other data structure 110 which stores index data generated during backup, migration, and restore and other storage operations as described herein. For example, performing storage operations on MICROSOFT EXCHANGE data may generate index data. Such index data provides a media agent 105 or other external device with a fast and efficient mechanism for locating data stored or backed up. Thus, in some embodiments, a storage manager database 111 may store data associating a client 85 with a particular calendar, a particular media agent 105 or storage device 115, for example, as specified in a storage policy, while media agent database 110 may indicate where specifically the client 85 data is stored in storage device 115, what specific files were stored, and other information associated with storage of client 85 data. In some embodiments, such index data may be stored along with the data backed up in a storage device 115, with an additional copy of the index data written to index cache 110. The data in index cache 110 is thus readily available for use in storage operations and other activities without having to be first retrieved from the storage device 115.

In some embodiments, certain components may reside and execute on the same computer. For example, in some embodiments, a client computer 85 such as a data agent 95, a media agent 105, or a storage manager 100 coordinates and directs local archiving, migration, and retrieval application functions as further described in U.S. patent application Ser. No. 09/610,738. This client computer 85 can function independently or together with other similar client computers 85.

Referring again to FIG. 2, a storage manager 100 may initiate a storage operation based on a storage policy, which may be stored in a database 111, and a non-standard calendar 240. For example, a storage policy may dictate that a storage operation may be performed on a weekly, monthly, yearly basis, or other frequency. Non-standard calendar 240 is generally a calendar which may be based on a Gregorian or standard calendar 210 that has been customized or defined using a calendar module 220. The calendar module 220 may include one or more modules, such as month module 222, day module 224, year module 225, offset module 226 which provide functionality for customizing aspects of the non-standard calendar 240. The functionality of the modules 222, 224, 225, 226 may be provided by one or more modules. A month module 222 may be used to specify and associate month-specific preferences. For example, a month module 222 may set the number of months in a year, the first month, of the year or other month related preference, for a non-standard calendar. Day module 224 may be used to set day-related calendar preferences, such as the number of days in a month, or other day specification. Year module 226 may be used to define year-related preferences, such as the number of years in a non-standard calendar, a first year in the calendar, or other year preference. The offset module 226 may be used to specify an offset for beginning a month on a particular day or beginning a year on a particular month, such as the $5^{th}$ of the month, second Monday of a month, third month of the year, or other offset.

Figure 3:
FIG. 3 is a table of calendar data according to an embodiment of the invention.

The non-standard calendar 240 may comprise a data file that may include one or more data items such as the data shown in the table of FIG. 3. As shown, calendar table 300 may include information and fields associated with a non-standard calendar such as an ID 320 or name for the calendar, first year 325, number of years 330, first month 335, first date 340, months per year 345, days per month 350, default 355, operations 360, storage policy 365 or other information. The non-standard calendar ID 320 can be any name, and may be user selected or automatically generated, e.g., based on a storage cell or storage operation. The non-standard calendar ID may be used to differentiate calendars when more than one calendar is used in a storage management system. The first year 325 is the initial or starting year of the calendar.

The number of years 330 may set the duration or term of the calendar. At the end of the non-standard calendar term, a user or system administrator may be notified that the non-standard calendar term has ended. Any storage operation requests received after the non-standard calendar term may fail or may require remedying. One example of remedying a storage operation request which is associated with an expired non-standard calendar may be provided by a storage manager, calendar module or other system component which may analyze the expired non-standard calendar associated with the storage operation request, and generate a predicted further term which has many or all of the calendar preferences or customizations included in the expired non-standard calendar. For example, if a two-year long non-standard calendar is created in which each year begins April $16^{th}$ and each month has a set number of days, at the end of the two year term, a storage manager, calendar module or other system component may extend the non-standard calendar for another year beginning April $16^{th}$ and having months of the same number of days. In the event that a calendar has expired and the system attempts to remedy a storage operation request and associated non-standard calendar, an alert may be sent which indicates that such action was taken and which may suggest that an expired calendar be extended or created anew.

Data relating to year preferences may be handled by a year module or other module. The first month 340 is the starting month of the calendar. For example, as shown, a fiscal calendar may begin in April, an academic calendar may begin in September, or other month may be used to commence the calendar year. Month preferences may be handled by a month module or other module. The first day of a month 340 may indicate the beginning date of a month or the first month. Day preferences may be handled by an offset module, day module, or other module. For example, for a non-standard calendar with settings that the 3rd is a first day of the first month of the calendar, there are 28 days in a month according to the day per month setting 350, the calendar automatically calculates the beginning of the next month, which would be 28 days after the 3rd day of the first month of the calendar. Calendars may be assigned an arbitrary number of months per year 345, for example, each year could have 6 months, 3 months or other number of months. Each calendar may be set as a default 355 calendar to use, in connection with cell components, storage policies, storage preferences, system component, storage operations, a particular user, application or data types, or other storage characteristic. Non-standard calendars may also be associated with particular storage operations 360, such as for use in selective deletion operations, selective copy operations, retention operations, migrations, restores, or other storage operations. In addition, non-standard calendars can also be associated with a storage policy 365. As described herein, storage policy information can include scheduling, a frequency, and other preferences for performing storage operations. Thus, in association with a non-standard calendar, a storage manager may initiate a storage operation according to a storage policy preference and using a non-standard calendar, e.g., a default non-standard calendar as defined in or associated with a storage policy.

Figure 4:
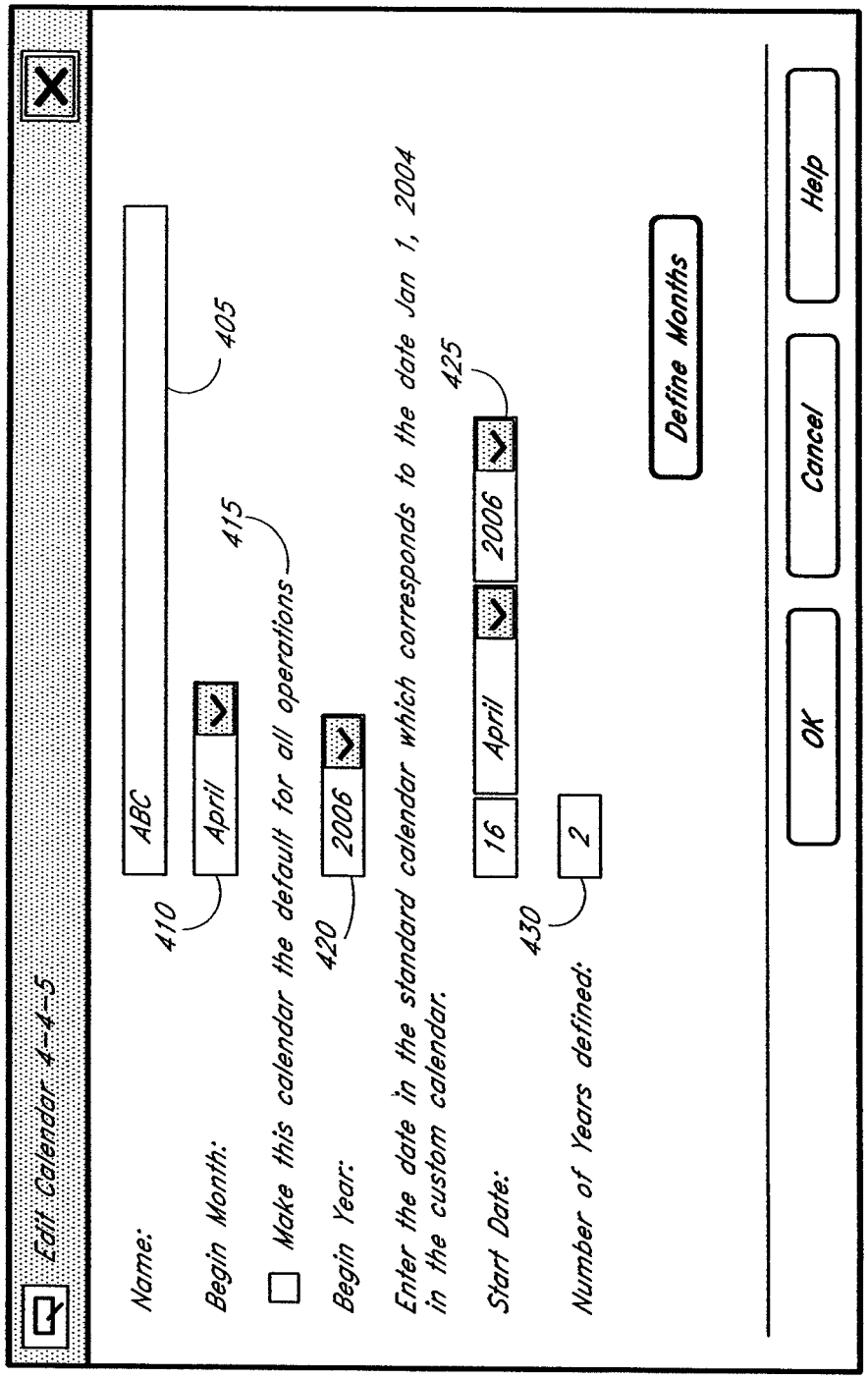
FIG. 4 is a graphical user interface for defining a calendar according to an embodiment of the invention.

The information stored in the table 300 may be received as user or administrator input. Alternatively, templates for non-standard calendars may be assigned automatically, for example, a default calendar, a fiscal calendar, academic calendar or other calendar, or a calendar associated with a similar cell, related storage policy or other logically associated entity. One example of a graphical user interface for entering calendar customization information is depicted in FIG. 4. As shown, a calendar name or ID, such as ABC, may be entered in box 405, which may correspond to information or an identifier stored in table 300 in column 325. A beginning month may be selected, box 410, such as April, which may correspond to the first month column 335 in table 300. The beginning month can be, for example, January as in a Gregorian calendar, or other month, such as April for a fiscal calendar, September for an academic calendar, or other month, etc. A user may select this calendar to use as a default calendar for all storage operations, box 415. If box 415 is selected, the non-standard calendar may be used for all storage operations. The starting year for the non-standard calendar may be selected in box 420, which is the beginning year in the non-standard calendar and which may correspond to the first year 325 in table 300. The start date for the calendar may be selected in box(es) 425, such as Apr. 16, 2006. The start date may correspond to a first date 340 in table 300. The number of years defined in box 430 may indicate the duration of the calendar, and may correspond to a number of years 330 in table 300.

Months in the non-standard calendar may be defined by a user in the screen shown in FIG. 5. As shown, a table 500 of months in a year may be defined in which the number of days 510 for each month 505 and the start date for the month 515 are customized. The number of days 510 may be specified which will also set the subsequent month's start date. For example, as shown, the ABC calendar includes twelve months, each of which has a different number of days. As shown, it may be convenient to provide months with days corresponding to a number of weeks, such as 21, 28, 35, etc. Alternatively, any random number of days may be assigned to a month. The first day in the year is Apr. 16, 2006, and the calendar module, month module, day module, offset module, or other module, may be used to automatically calculate a month's starting date 515 based on a predefined number of days in a month 510 and the month 505, or to calculate a number of days in a month 510 based on a specified month's starting date 515.

Figure 6:
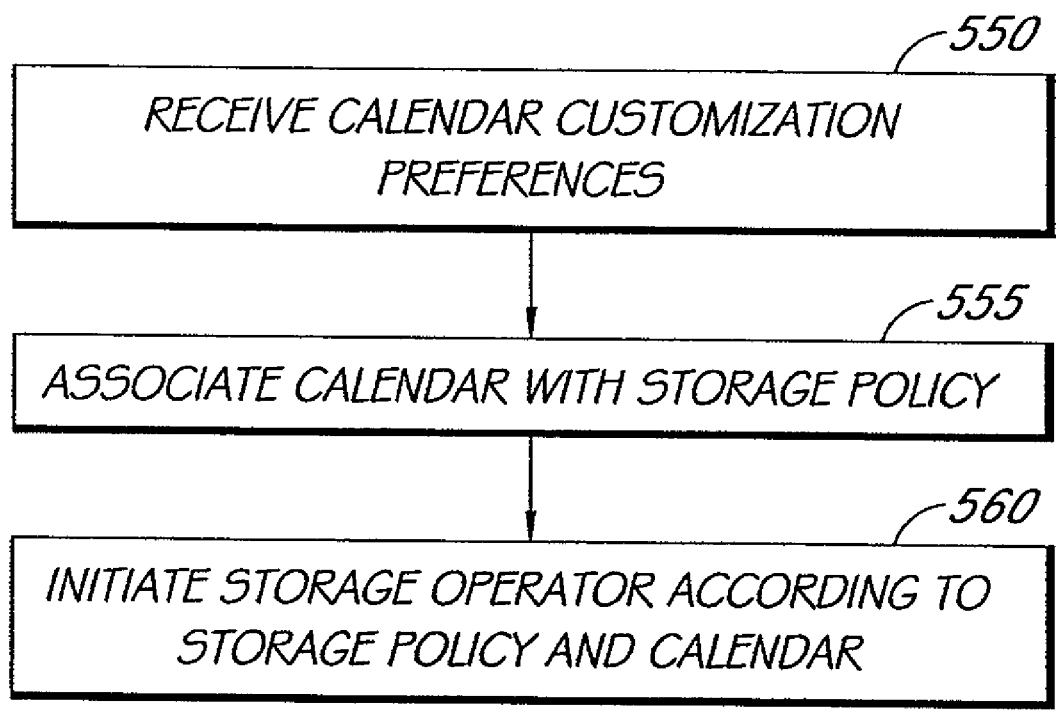
FIGS. 6 and 7 are flow diagrams for performing a storage operation according to embodiments of the invention.

Turning now to FIG. 6, which depicts a flow diagram for a method for performing a storage operation, calendar customization preferences may be received, step 550. The calendar customization preferences may be received as described herein. For example, a user may input preferences for month start dates, number of days in a month, number of months in a year, beginning month of a year, or other non-standard calendar preference. The non-standard calendar preferences may be associated with a storage policy, step 555. The non-standard calendar may be associated with a storage policy by, for example, storing an indicator, link, pointer or other reference that indicates an association of the storage policy and non-standard calendar in a database, table or index. One such table for storing an association between a storage policy and non-standard calendar may be the table depicted in FIG. 3, in which a non-standard calendar has an associated storage policy 365.

As described herein, a storage policy may include information or preferences for performing a storage operation. A storage manager may consult a storage policy and its associated non-standard calendar to initiate a storage operation, step 560. For example, a storage policy may indicate that a client should retain a copy of data for six months. The non-standard calendar associated with the storage policy will automatically calculate or otherwise determine the term for the six month period to perform the storage operation for this storage policy. For example, if a non-standard calendar is created in which a month has 28 days, a copy of data retained for six months is actually retained for six 28 day periods, and not six standard calendar months. In another example, if a non-standard calendar is created in which a calendar year begins April 16.sup.th, and a storage operation is to be performed on the third day of each calendar year, the storage operation will be initiated on April 19.sup.th. The storage manager, calendar module or other system component may automatically calculate the appropriate time for the storage operation to initiate based on the storage policy and the non-standard calendar, and initiate the storage operation, accordingly.

Figure 7:
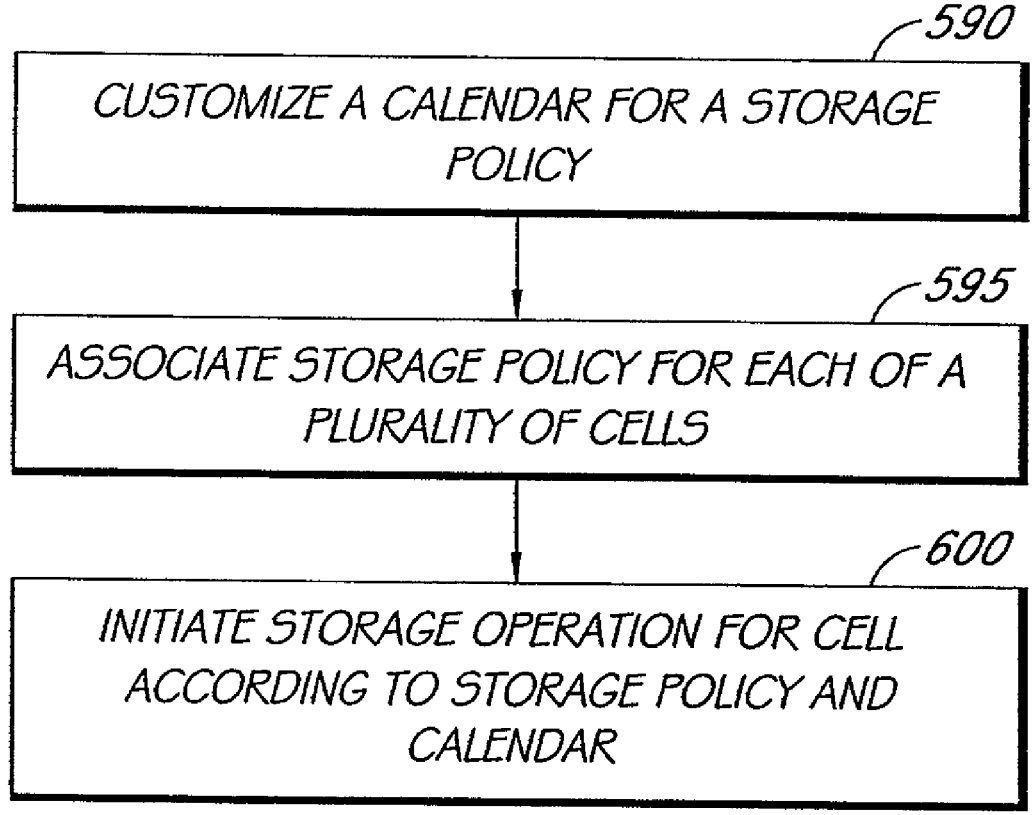

Referring to FIG. 7, a non-standard calendar can also be created, as described herein, and set to be associated with one or more storage policies, step 590, by storage data indicating the association of the calendar and storage policy in a database, index or table. For example, as shown in FIG. 3, a specified calendar, e.g. in column 320 may be associated with a storage policy in column 365. A storage policy may be associated with each of a plurality of cells, step 595, for example, by storing information indicating the association of the storage policy and the cell in a database, table or index. For example, a cell that is associated with an application, group of users, geographical location, or other group, may be associated with a storage policy. The cell may be associated with the storage policy by storing an indication of the relationship between the cell and storage policy in a database, table or index.

With the storage policy, non-standard calendar and cell information, a storage manager may initiate a storage operation according to the storage policy and calendar, step 600. In general, to initiate or direct a storage operation, a storage manager consults its index or database to obtain storage policy information, which may include associations with a storage operation cell and a non-standard calendar. Thus, the storage manager, jobs agent, management agent or other component may schedule storage operations based on the storage policy, cell information, non-standard calendar, or other storage preferences. One example of such operation may be that a storage policy dictates that a storage operation, such as selective deletion, selective copy of electronic data, a backup or other transfer of electronic data may be performed Selective deletion of electronic data may be performed by establishing a selection criterion that may be a property or characteristic of a data item that is used to select the data item for deletion, or other storage operations. The same selection criteria may be used to selectively copy data, e.g., selecting data based on the selection criteria to be copied. The selection criteria may be based on time, such as the time the data item was stored, cycle, such as a number of cycles occurred or storage operations performed since the data was stored, application type, data type, user that generated the data, or other selection criteria. A selection criteria that relates to time can be used together with a non-standard calendar. For example, a time based selection criteria may be that a data item is to be deleted (in a selective deletion operation) or copied (in a selective copy operation) if it is more than three years old. A non-standard calendar may set forth that a year is twelve 28-day months. In that scenario, a three-year old data item is actually less than three standard years old. However, a storage manager or other system component can automatically count a time-based selection criteria according to an associated non-standard calendar to correctly determine the relevant time period.

A selection criteria may also be used in extended retention operations. For example, a criterion may be specified relating to a retention preference and/or aging preference, such as a time period to retain a data item before aging the data off by either deleting the data or creating a copy for long term storage. The retention preference may be specified that a particular data item, or a class of data items, such as a particular data type, application type, client, user generating the data, or other class, may be retained for three years. The retention preference may be associated with a non-standard calendar so that a storage manager or other system component may determine the time period that a retention preference of three years corresponds to in the non-standard calendar.

Figure 8:
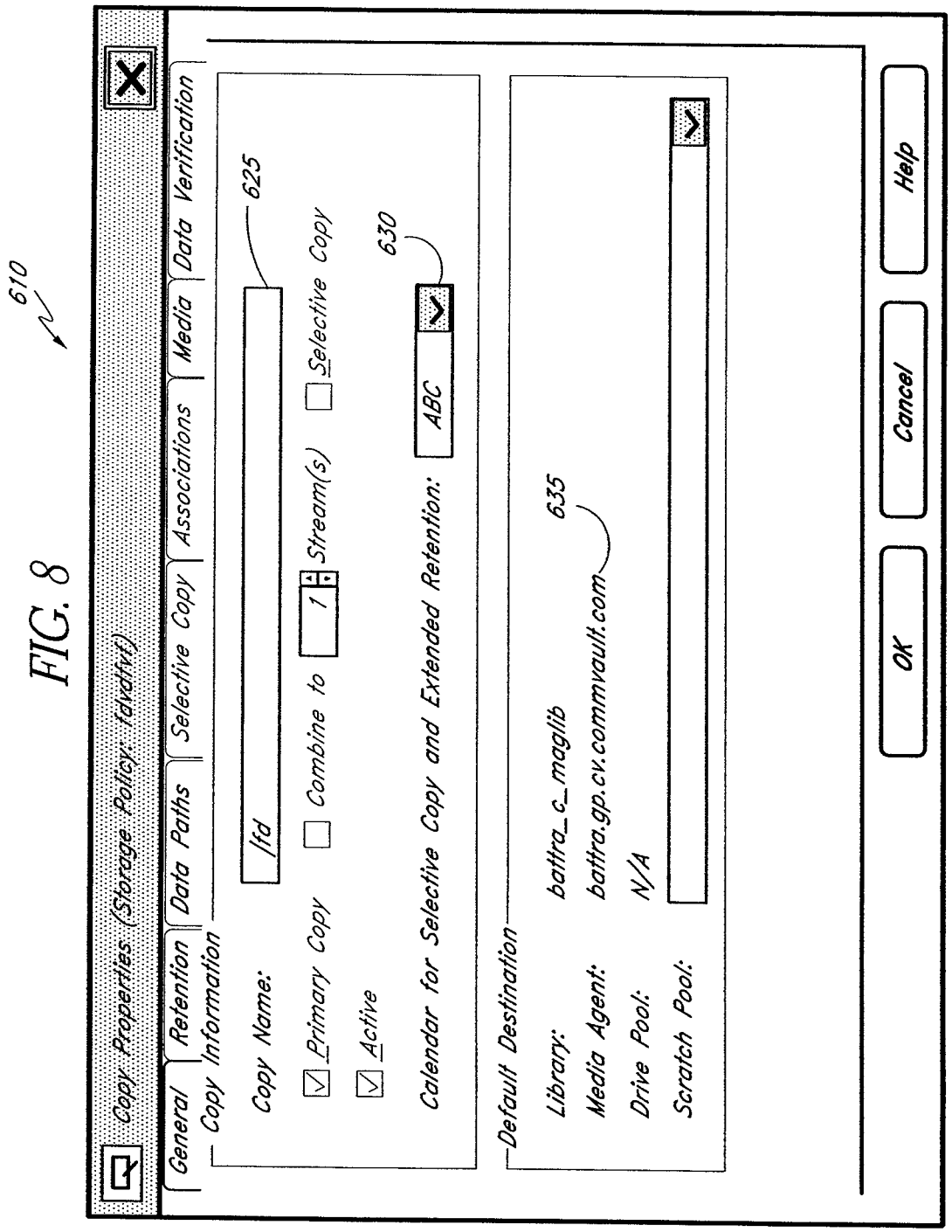
FIG. 8 is a graphical user interface for associating a non-standard calendar with a storage operation according to an embodiment of the invention.

One way to associate a non-standard calendar and a particular storage operation is by input by a user or administrator. Referring to FIG. 8, which depicts a graphical user interface, properties or preferences to performing a storage operation may be named as specified in box 625. The storage operation may then be associated with a calendar, such as a standard or non-standard calendar (e.g., as shown the ABC calendar defined in FIGS. 3-5, or other calendar) by selecting box 630. The association of the storage operation 625 and calendar 630 causes all operations relating to the storage operation to be performed based on the selected calendar 630. Other information about the storage operation, such as a default destination, e.g., a library, media agent, drive pool and scratch pool may be set in box 635.

Figure 9:
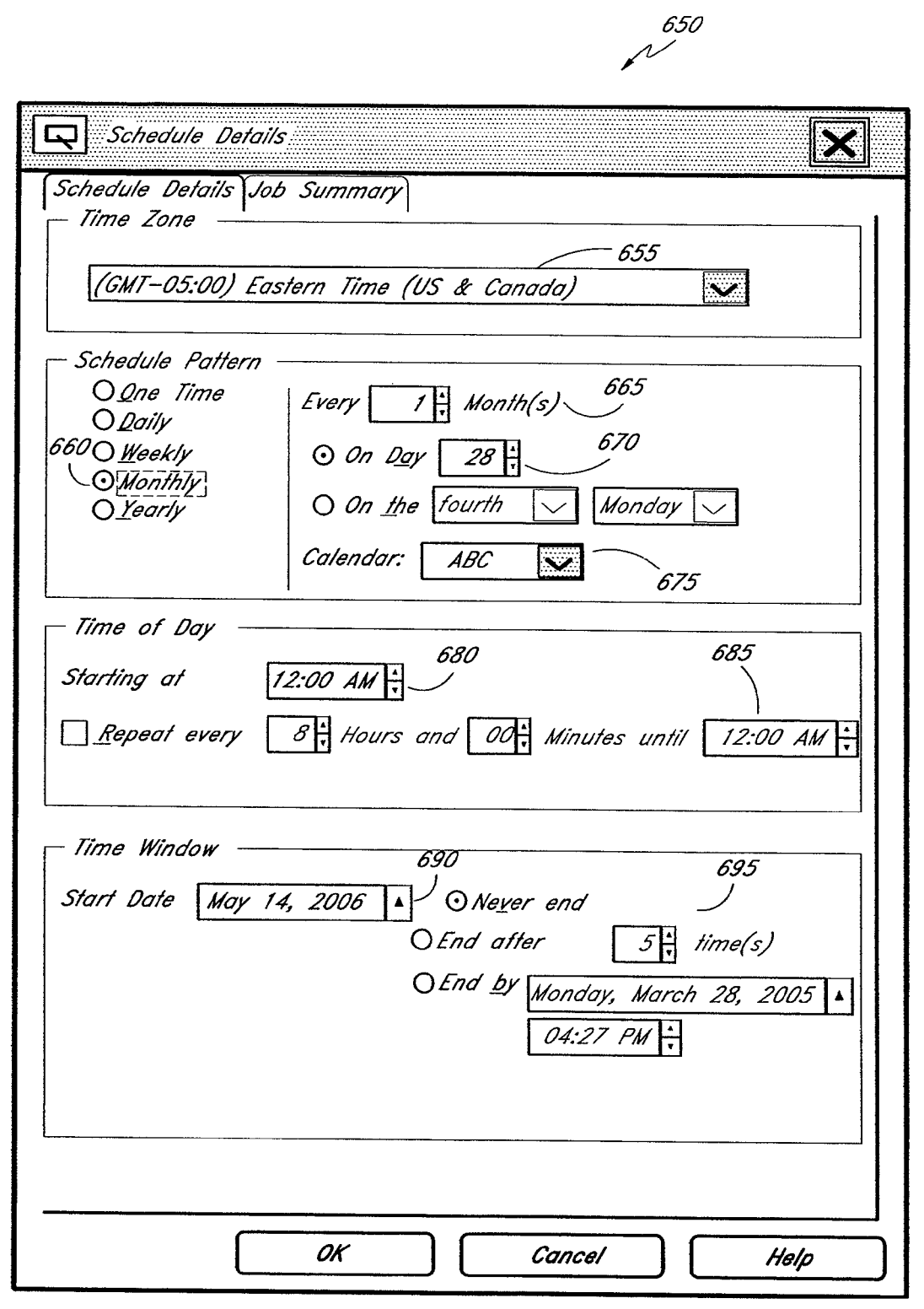
Figure 10:
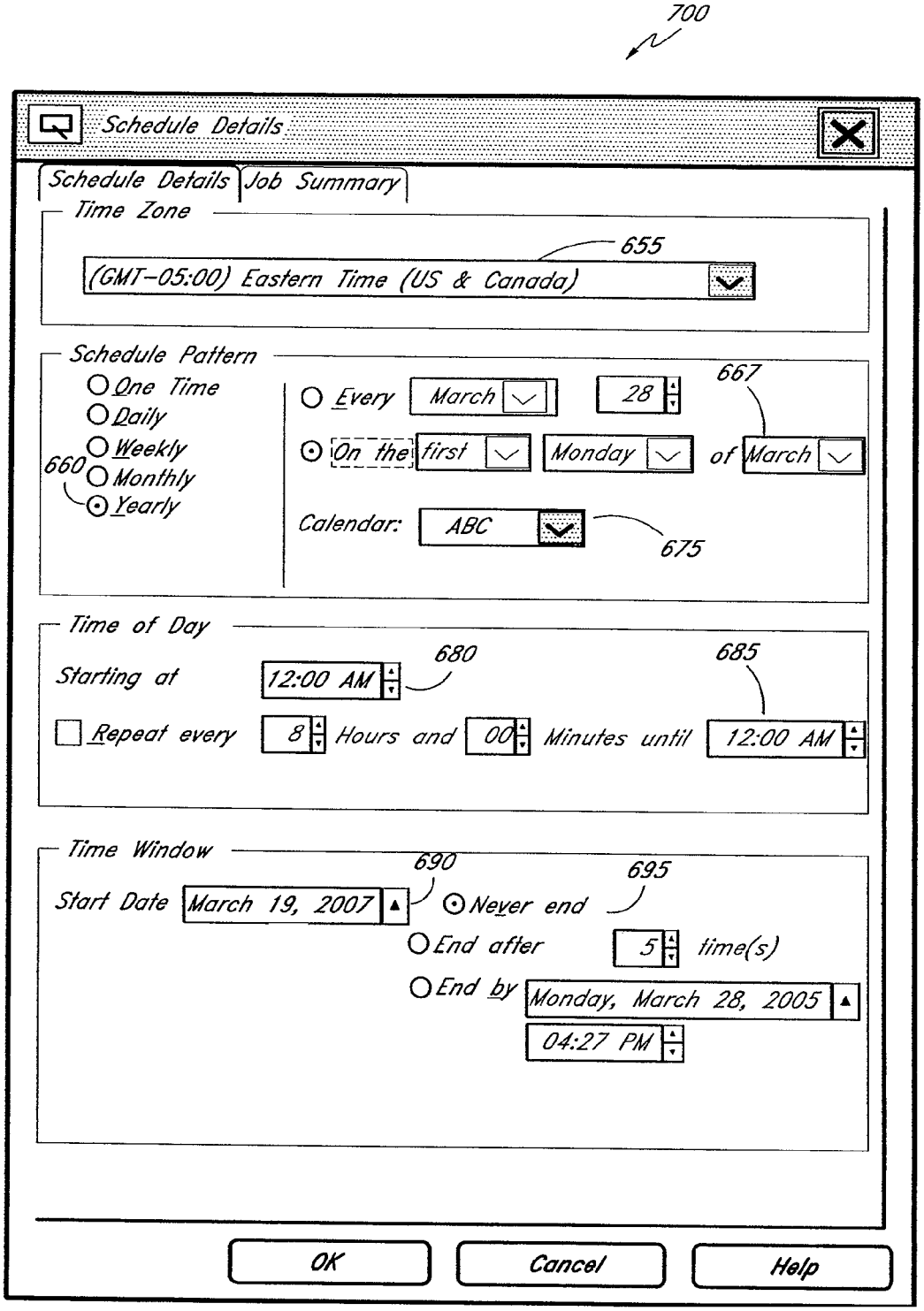

Details relating to the storage operation may be entered in the graphical user interfaces depicted in FIGS. 9 and 10. In screen 650 and 700, a time zone 655 may be selected for the storage operation. A pattern for scheduling a storage operation may be set in areas 660 as once, daily, weekly, monthly, yearly, or other time interval. Alternatively, a schedule pattern shown in FIG. 9 may be set as a certain number of months in box 665, on a particular day of a month in box 670, and the calendar the schedule is based on, may be selected as standard or non-standard (e.g. as shown, the ABC calendar defined in FIGS. 3-5, or other calendar) in box 675. The scheduling pattern shown in FIG. 10 also includes a box for a specific data to perform a storage operation, or a day of a week of a certain month in box 667, using a calendar (standard or non-standard) specified in box 675. Other scheduling patterns that may be entered include for example, a day of a week, hour of a day, or other time.

The schedule pattern may be automatically determined according to an associated non-standard calendar. For example, as shown in FIG. 9, a storage operation scheduled to occur monthly (660) on day 28 of a month (665, 670), using the ABC calendar (675) which is defined in reference to FIGS. 3-5, may be initiated on a start date May 14, 2006 (690) which corresponds to the 28.sup.th day of the first month of the ABC calendar, which begins on Apr. 16, 2006. In another example, as shown in FIG. 10, a storage operation set to be initiated on a first Monday of March (667) in the ABC calendar (675) which is defined in reference to FIGS. 3-5, the first Monday of March may be automatically calculated to be Mar. 19, 2007 (690) since the ABC calendar begins Apr. 16, 2006.

A time of day for performing the storage operation may be entered in box 680, 685. In general, the time of day for performing the storage operation may take into consideration scheduling of system resources for performing storage operations. A time window may also be set in box 695 which may set forth an end time for the defined storage operation. For example, as shown, a storage operation definition may be set through a particular date, number of cycles, other end point, or it may be open ended. In the event that the storage operation definition is defined to never end (695), the storage manager, calendar module, or other system component may automatically predict an extended term for a non-standard calendar associated with the storage operation definition which may override a defined term, such as that a calendar is defined for two years.

Figure 11:
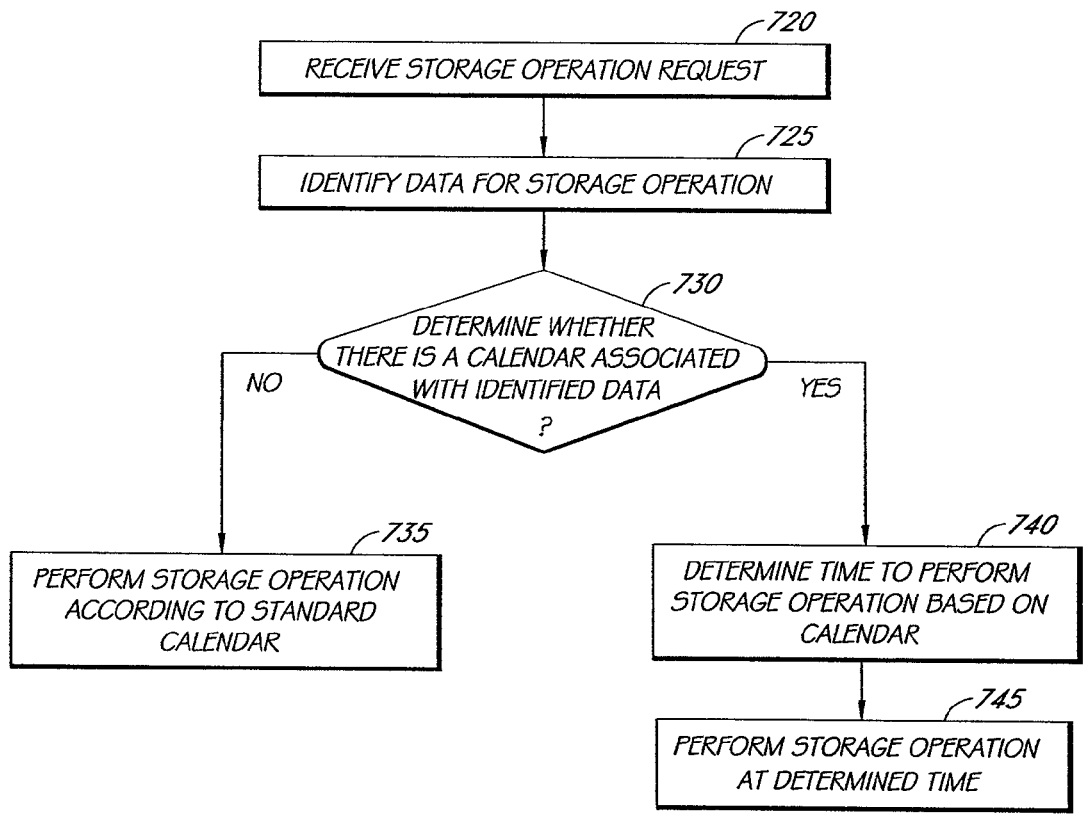
FIG. 11 is a flow diagram for performing a storage operation according to an embodiment of the invention.

Referring to FIG. 11, which depicts a flow diagram for performing a storage operation, a storage operation request may be received, step 720. In general, a storage manager may receive a request to perform a storage operation from a user or administrator, or in accordance with a storage operation initiator automatically issued according to a storage policy or other system instruction. The storage manager may identify the data relevant to the storage operation request, step 725. The storage operation request may include information about the data relevant to the storage operation request or alternatively, the storage manager may obtain the data information by consulting a database or index. The data relevant to the storage operation request may also be identified according to a selection criteria, which may be included in a storage operation request, a storage policy, user inputted, or otherwise provided. The selection criteria may relate to data. For example, the selection criteria may be data type, application type, cell group, or based on a user, organization, geographic location, client, or other criteria. A storage manager, media agent or other component may consult a database, table or index to identify data satisfying the selection criteria. Alternatively, a media agent, or other component, may read data headers to identify data, or other method to identify data based on a selection criteria.

When the data item has been identified, a storage manager may consult a database or index to determine whether a non-standard calendar is associated with the data item, step 730. For example, the storage manager may consult a table such as the table shown in FIG. 3. Alternatively, information relating to a non-standard calendar may be included in a storage operation request. In the event that no non-standard calendar is associated with a data item, the storage operation may be scheduled and performed using a standard calendar, step 735. In some cases, a non-standard calendar may be associated with a data item, however the term or duration of the non-standard calendar has ended. When the non-standard calendar is not longer valid, an alert may be sent to a system administrator which notifies the administrator of the non-standard calendar problem, and the storage manager may perform the storage operation according to a standard calendar. Alternatively, a storage manager, calendar module or other system component may attempt to predict a further term for the expired non-standard calendar by applying some or all preferences in an expired non-standard calendar to a time period following the term of the expired non-standard calendar.

If a non-standard calendar is associated with the identified data item, a non-standard calendar customization module may provide the non-standard calendar to a storage manager, and the storage manager, or other component may determine a time to perform a storage operation based on the non-standard calendar, step 740. For example, if a storage policy sets forth that a storage operation is to occur at a frequency of once per month at the beginning of a month and a non-standard calendar dictates that a month begins on the 5.sup.th of the month and the first month is February, the storage manager or other component determines that the first storage operation according to the storage policy should occur on the 5.sup.th of February, then the 5.sup.th of March, then the 5.sup.th of April, and so on. On these determined times, the storage manager may initiate the storage operation to be performed by system components, step 745.

Figure 12:
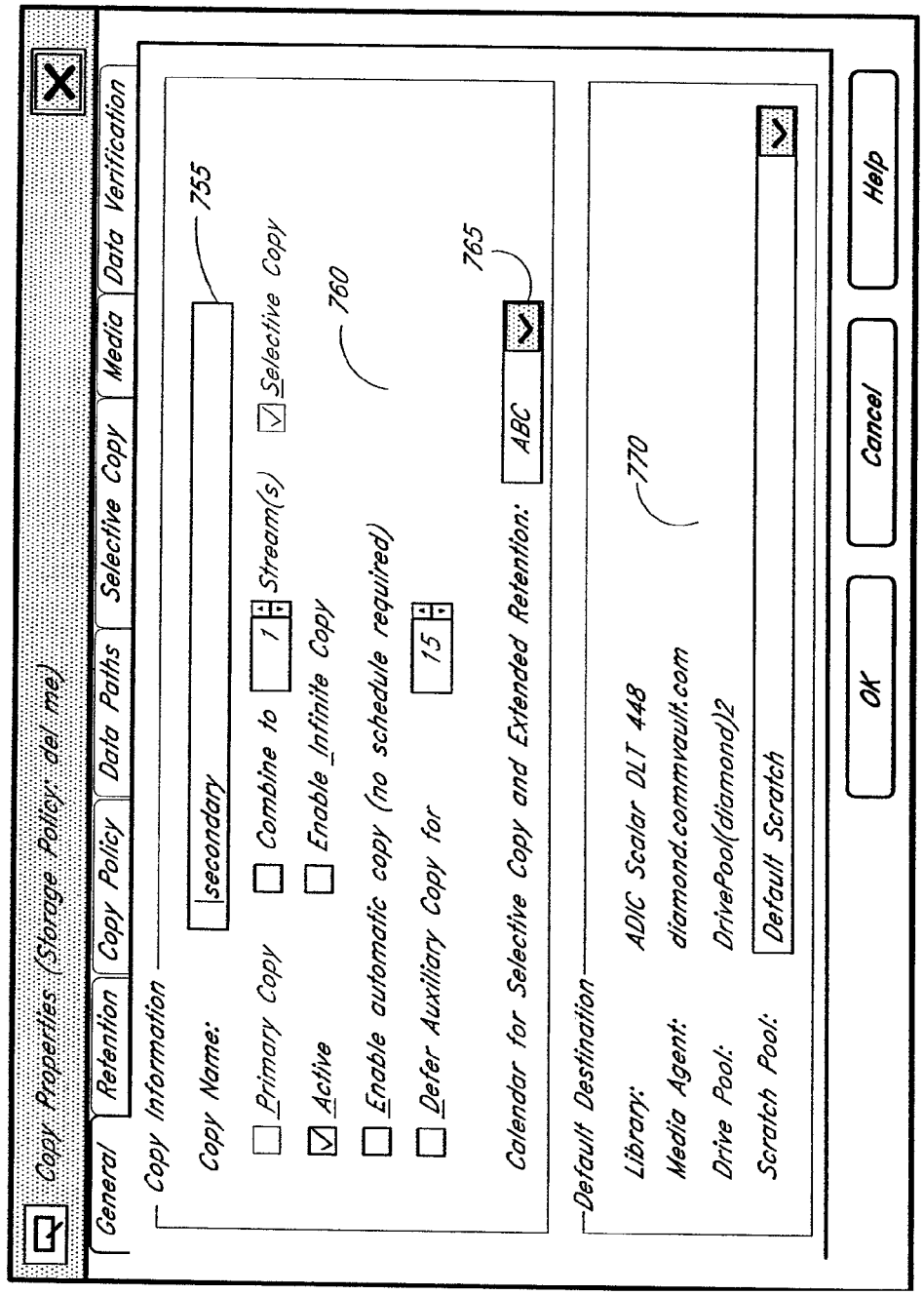
FIGS. 12-14 are graphical user interfaces for entering rules for performing storage operations according to an embodiment of the invention.

FIG. 12 depicts a graphical user interface which may be used to associate a non-standard calendar with a storage policy, selective copy operation or an extended retention operation. As shown, screen 750 includes a box for a copy name, 755, which may be used to name a copy. Details relating to the storage operation may be entered in area 760 relating to, for example, using a primary copy or other copy for performing a storage operation, a number of streams to use in the storage operation, enabling inline copying, automatic copying, setting a time to create an auxiliary copy, such as deferring a time, selecting a calendar, such as a standard calendar or non-standard calendar, or other storage operation detail. In addition, destination details may also be entered in area 770 relating to library, media agent, drive pool or scratch pool to use in a storage operation.

Figure 13:
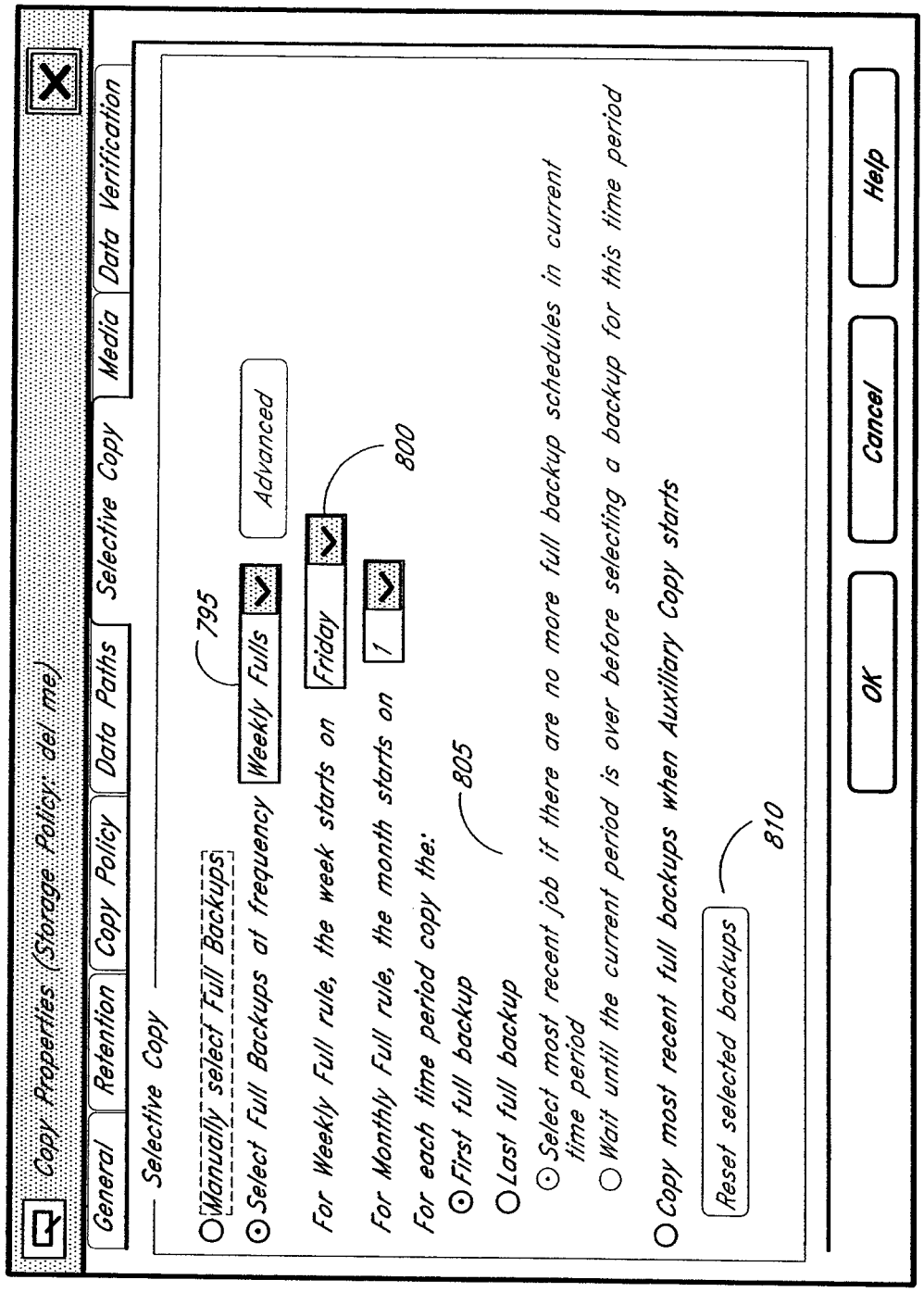

Further details relating to a storage operation may also be entered relating to a selective copy operation as shown in FIG. 13. FIG. 13 depicts a graphical user interface 790 for setting storage operation details for a selective copy operation. As shown, backups in a selective copy operation may be manually selected, or according to a frequency 795, which may be weekly, daily, monthly, or other time period. The frequency 795 for performing the selective copy operation may also be set using a non-standard calendar. Thus, for a defined non-standard calendar in which a month has 28 days, a selective copy operation set to be performed monthly will be initiated every 28 days according to the non-standard calendar and not according to a month in a standard calendar. The frequency 795 can be further specified to occur on a particular day, 800. The selective copy operation details may also include the data copy to be used, e.g., a first full backup, last full backup or other copy, 805. In addition, the selective copy operation may be linked to an auxiliary copy operation, 810, to streamline one or more copy operations.

Figure 14:
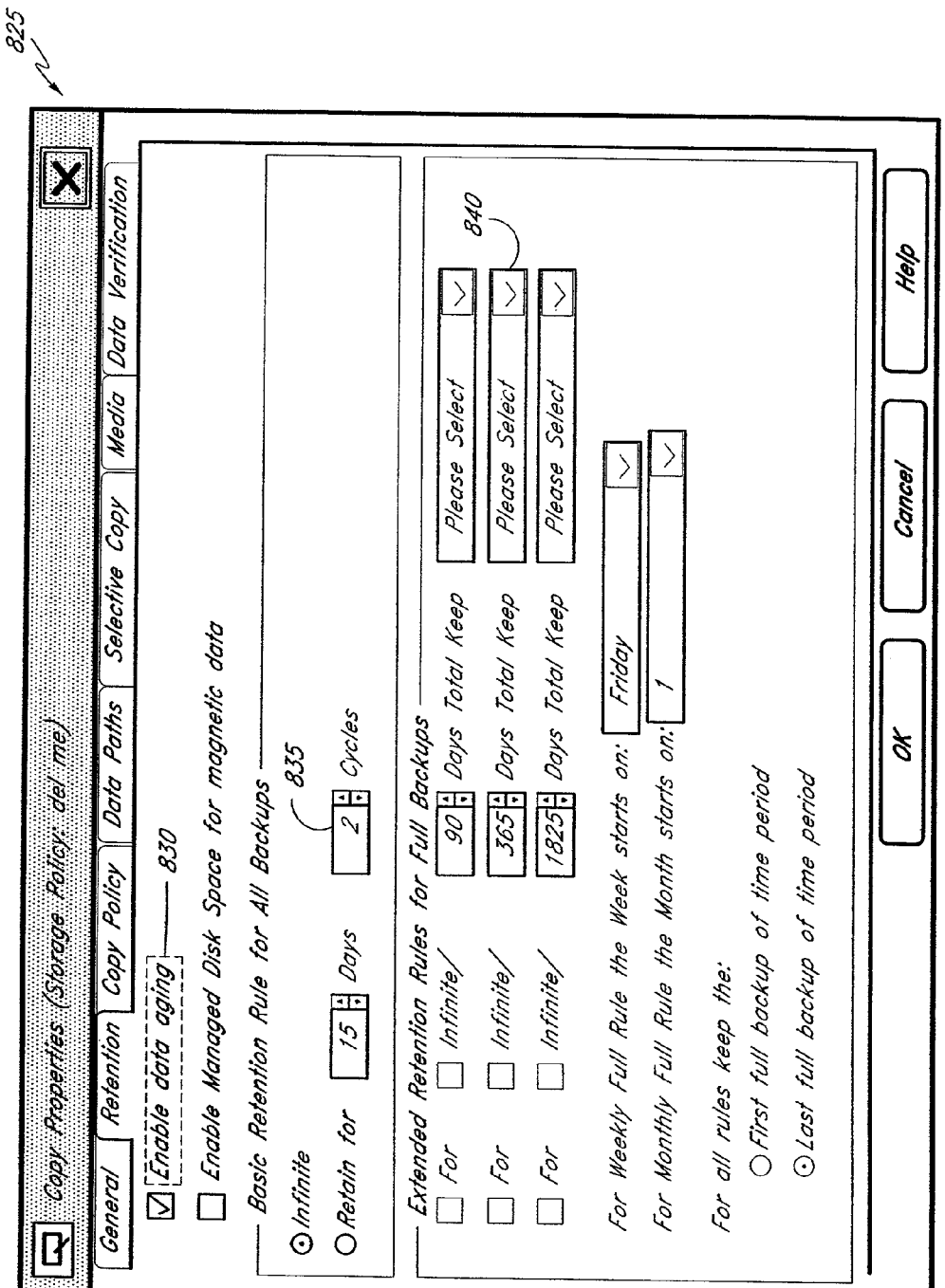

Details relating to an extended retention operation may be entered in a graphical user interface, such as the screen 825 shown in FIG. 14. As shown data may be aged by selecting box 830. Alternatively, data may be managed using magnetic data. Rules may be set forth for aging data by setting aging rules, such as infinite, or according to a time period or cycles 835. Extended rules may be set up for extended retention in area 840, such as time periods to keep selected copies, or setting a flexible time period for initiating a retention operation. In general, based on the rules entered in screen 825, a storage manager may direct a media agent to identify data satisfying a selection criteria, such as a type of copy, data type, or other criteria. Identified data satisfying the selection criteria may be retained according to the rule.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. method for performing a storage operation, the method comprising:

storing a plurality of calendars, the calendars comprising at least a Gregorian calendar and a user-customized non-Gregorian calendar;

receiving a first storage policy, the first storage policy defining one or more storage operations to perform on one or more data items, wherein the first storage policy is associated with the Gregorian calendar;

receiving a second storage policy, the second storage policy defining one or more storage operations to perform on one or more data items, wherein the second storage policy is associated with the user-customized non-Gregorian calendar;

storing information in at least one database that the first storage policy is associated with the Gregorian calendar and further storing that the second storage policy is associated with the user-customized non-Gregorian calendar;

generating a first schedule for performing at least a first storage operation based on the first storage policy and the Gregorian calendar;

generating a second schedule for performing at least a second storage operation based on the second storage policy and the user-customized non-Gregorian calendar, wherein the first and second schedules are generated independently of each other;

performing with one or more computer processors based on the first schedule, the first storage operation associated with first storage policy by using the Gregorian calendar independent of the second storage policy and the user-customized non-Gregorian calendar associated therewith; and performing with one or more computer processors based on the second schedule the second storage operation associated with the second storage policy by using the user-customized non-Gregorian calendar.

2. The method of claim 1 further comprising transmitting an alert when a storage operation time comprises a time after a first term of the user-customized non-Gregorian calendar expires.

3. The method of claim 1 further comprising predicting a second term of the user-customized non-Gregorian calendar, wherein a first term and a second term of the user-customized non-Gregorian calendar include at least one common time flexible preference.

4. The method of claim 1 wherein the one or more storage operations associated with the user-customized non-Gregorian calendar of the second storage policy, comprises a selective copy operation.

5. The method of claim 1 wherein the one or more storage operations associated with the user-customized non-Gregorian calendar of the second storage policy comprises a retention operation.

6. A method for scheduling a storage operation, the method comprising:

associating in a storage system a first storage policy with a Gregorian calendar, the first storage policy comprising a first frequency for performing one or more storage operations;

associating in the storage system a second storage policy with a user-customized non-Gregorian calendar, the second storage policy comprising a second frequency for performing one or more storage operations;

determining with one or more computer processors when to perform the first frequency of the storage operations associated with the first storage policy based on the Gregorian calendar independently of the user-customized non-Gregorian calendar; and determining with one or more computer processors when to perform the second frequency of the storage operations associated with the second storage policy based on the user-customized non-Gregorian calendar independently of the Gregorian calendar.

7. The method of claim 6 further comprising transmitting an alert when a storage operation time comprises a time after a first term of the user-customized non-Gregorian calendar expires.

8. The method of claim 6 further comprising predicting a second term of the user-customized non-Gregorian calendar, wherein a first term and a second term of the user-customized non-Gregorian calendar include at least one common time flexible preference.

9. The method of claim 6 wherein the one or more storage operations associated with the user-customized non-Gregorian calendar of the second storage policy, comprises a selective copy operation.

10. The method of claim 6 wherein the one or more storage operations associated with the user-customized non-Gregorian calendar of the second storage policy comprises a retention operation.

11. The method of claim 6 wherein the second frequency associated with the user-customized non-Gregorian calendar is converted into a third frequency associated with the Gregorian calendar.

12. A storage management system for scheduling a storage operation, the storage management system comprising:

a storage device configured to store a plurality of data items and a plurality of calendars, the plurality of calendars comprising at least a Gregorian calendar and a user-customized non-Gregorian calendar;

a first storage policy configured to define one or more storage operations to perform on one or more data items, the first storage policy associated with the Gregorian calendar;

a second storage policy configured to define one or more storage operations to perform on one or more data items, the second storage policy associated with the user-customized non-Gregorian calendar; and a storage manager configured to determine with one or more computer processors a first time to perform the at least one storage operation according to the first storage policy, the first time relating to the Gregorian calendar and wherein the storage manager is configured to determine the first time independently of the user-customized non-Gregorian calendar, and wherein the storage manager is further configured to determine a second time to perform the least one storage operation according to the second storage policy, the second time relating to the user-customized non-Gregorian calendar and wherein the storage manager is configured to determine the second time independently of the Gregorian calendar.

13. The storage management system of claim 12 wherein the storage manager is configured to transmit an alert when a storage operation time comprises a time after a first term of the user-customized non-Gregorian calendar expires.

14. The storage management system of claim 12 wherein a first term and a second term of the user-customized non-Gregorian calendar include at least one common time flexible preference.

15. The storage management system of claim 12 wherein the one or more storage operations associated with the user-customized non-Gregorian calendar of the second storage policy, comprises a selective copy operation.

16. The storage management system of claim 12 wherein the one or more storage operations associated with the user-customized non-Gregorian calendar of the second storage policy comprises a retention operation.

17. The storage management system of claim 12 wherein the second time associated with the user-customized non-Gregorian calendar is converted into a third time associated with the Gregorian calendar.

* * * * *